United States Patent [19]
Larsen

[11] 4,425,536
[45] Jan. 10, 1984

[54] POSITIVE CONTACTS COMMUTATOR APPARATUS

[76] Inventor: Dwayne E. Larsen, 2103 E. Des Moine, Mesa, Ariz. 85203

[21] Appl. No.: 337,690

[22] Filed: Jan. 7, 1982

Related U.S. Application Data

[63] Continuation-in-part of Ser. No. 95,500, Nov. 19, 1979, abandoned.

[51] Int. Cl.³ .............................................. H02K 13/00
[52] U.S. Cl. .................................. 318/439; 318/138; 318/541; 310/222; 310/233
[58] Field of Search ............... 310/219, 220, 221, 222, 310/223, 224, 225, 226, 227, 229, 230, 232, 233, 234, 235, 236, 237, 148–151, 136–142, 68 R, 68 D, 248, 249; 318/138, 361

[56] References Cited

U.S. PATENT DOCUMENTS

| | | | |
|---|---|---|---|
| 2,707,257 | 4/1955 | Alexanderson | 318/439 |
| 3,381,210 | 4/1968 | Shano | 322/100 |
| 3,437,898 | 6/1969 | Bates | 310/220 |
| 3,453,513 | 7/1969 | Bates | 318/439 |
| 3,532,949 | 10/1970 | Williams | 363/103 |
| 3,789,282 | 1/1974 | Hartz | 310/148 |
| 3,959,705 | 5/1976 | Salihi | 318/138 |

Primary Examiner—R. Skudy
Attorney, Agent, or Firm—H. Gordon Shields

[57] ABSTRACT

Commutator apparatus for electric motors includes electrical conductors making electrical contact with brushes through substantially three hundred sixty degrees of rotation of the commutator to provide current paths during time periods of current flow to prevent arcing. The commutator apparatus further includes cylindrical portions and blade portions which overlap and on which brushes are positioned to make the electrical contacts.

14 Claims, 20 Drawing Figures

_Fig. 8A_  _Fig. 8B_  _Fig. 8C_  _Fig. 8D_

_Fig. 10_

POSITIVE CONTACTS COMMUTATOR APPARATUS

REFERENCE TO RELATED APPLICATION

This application is a continuation-in-part application of Ser. No. 095,500, filed Nov. 19, 1979, and now abandoned.

BACKGROUND OF THE INVENTION

1. Field of the Invention

This invention relates to electrical motors and, more particularly, to commutators for the rotors of electric motors in which positive electrical contact between the rotating commutator and brushes secured to the stationary stator is made throughout substantially three hundred sixty degrees of rotation of the commutator.

2. Description of the Prior Art

An electric motor, or generator, includes two major portions, a movable portion, generally referred to as the rotor, or armature, and a stationary portion, generally referred to as the stator. The generation of electricity, or the utilization of electricity depends on the relative motion between the armature and the stator.

The commutator is the part of the armature to which the armature coils of a motor are connected. It generally comprises a plurality of wedge shaped copper segments or bars disposed about a central steel hub or shaft. The segments comprising the commutator are insulated from each other and from the hub. The brushes ride on the outer peripheral edges of the commutator bars to connect the armature coils to a power source. The commutator segments extend radially outwardly from the center hub, which is part of the shaft of a motor or generator. The commutator segments are insulated from each other to provide polarity control for the armature.

The brushes are typically made of carbon, which is a considerably softer material than the copper out of which the commutator is made. In order to maintain a positive contact between the commutator and the brushes, a spring bias is applied to the brushes to hold them against the commutator. Accordingly, there is wear in the brushes occasioned by the frictional contact over a period of time.

In addition to the frictional wear of the brushes, the brushes and the commutator are subject to wear by arcing between the commutator and the brushes as the brushes pass over the insulated gap between the commutator bar. The arching is caused by the momentary break in electrical contact between the brushes and the commutator bars as current continues to flow and flows across the gap.

The arcing represents wasted energy as well as a wear factor on the brushes. Furthermore, the arcing must be controlled, or contained, in certain environmental applications of an electrical motor where the arcing could result in explosions or fires.

Generally speaking, the higher the inductance of the motor, the greater the arcing. Accordingly, with motors of high inductance, the arcing tends to be more of a problem than with motors of low inductance.

Prior art methods of eliminating or reducing the arcing includes the employment of diodes, such as disclosed in U.S. Pat. No. 3,381,210. A diode is used in the '210 patent to connect the slip rings on the rotor shaft through which current is supplied to the field winding of the alternator. The diode is polarized to provide a return path for energy stored in the field winding when the current flow to the field winding is interrupted.

A different approach to improving the efficiency of commutators and brushes is shown in U.S. Pat. No. 3,437,898. In the '898 patent, disc commutators are secured to the armature, with thyristors included in the electrical circuitry with disc commutators and brushes.

U.S. Pat. No. 3,532,949 discloses another approach to reducing or eliminating sparking between a commutator and its brushes. Diodes and thyristors are used to polarize and control the current flow to prevent the arcing. Aside from the differences in the circuitry, the commutator and brush system of the '949 patent is typical of the prior art commutators and brushes, as described above. Similarly, the commutator and brush arrangement is typical of the prior art.

The apparatus of the present invention employs a different type of commutator than is disclosed in the prior art.

SUMMARY OF THE INVENTION

The invention described and claimed herein comprises a commutator and brush arrangement in which positive contact is maintained between the rotating commutator and the stationary brushes by pairing brushes with diodes to control the polarity of the current flow between the brushes and by employing a dual commutator comprising a pair of commutators configured for changes in polarity with respect to the degree or arcuate rotation of the commutator portions.

Among the objects of the present invention are the following:

To provide new and useful electric motor apparatus;

To provide new and useful electric motor apparatus in which the brushes and commutator maintain positive electrical contact;

To provide new and useful commutator apparatus for electric motors;

To provide new and useful commutator and brush apparatus for electric motors;

To provide new and useful non-sparking commutator and brush apparatus for electric motors;

To provide new and useful electric motors in which the relative motion between brushes and commutators is without sparking;

To provide new and useful apparatus for inverting dc current to ac current; and

To provide new and useful inverter apparatus for changing direct current to alternating current including a rotating commutator and brushes selectively engaging the rotating commutator.

DESCRIPTION OF THE PREFERRED EMBODIMENT

Figure 1:
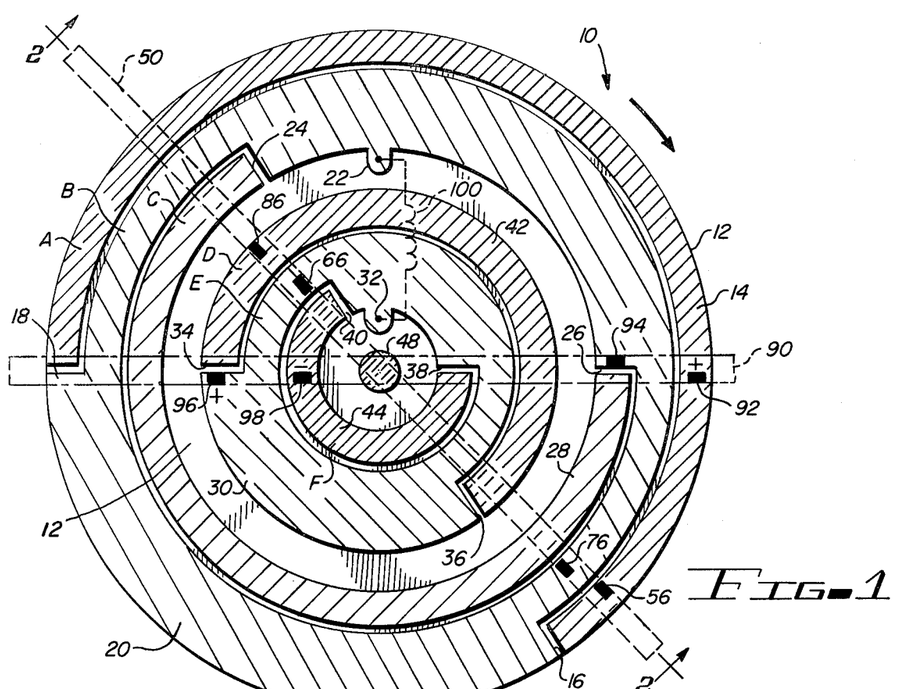
FIG. 1 is a top view of a brush and commutator arrangement of the apparatus of the present invention.

FIG. 1 comprises a top view of a commutator and brush apparatus 10 of the present invention. The commutator and disc apparatus 10 includes a commutator disc 12, which is preferably made of nonconductive material and which is secured to a rotating armature shaft 48 of an electric motor to which the apparatus 10 is secured. The commutator disc 12 includes a plurality of conductive segments disposed concentrically about the center of the disc, which is the armature shaft 48. The conductive segments include pair of active conductor segments 20 and 30 and four passive segments 14, 28, 42, and 44.

The segments are disposed arcuately and, with respect to the conductive segments or portions 20 and 30, also radially on the commutator disc 12. The segments are spaced apart from each other, again both arcuately and radially, and are arranged on six concentrically disposed tracks, which tracks are designated by letters A, B, C, D, E and F. The outermost track on the commutator disc 12 is track A and the innermost track on the disc is track F. The tracks are concentrically disposed about the center of the disc, and accordingly about the shaft 48. Part of the tracks A and C, and all of track B, are covered by conductive segment 20. Part of tracks D and F, and all of track E, are covered by conductive segment 30. The passive segments 14, 28, 42, and 44 complete the remainder of tracks A, C, D, and F, respectively.

A pair of brush holders 50 and 90 are disposed adjacent the disc 12, and each brush holder includes four brushes which are spaced apart on the brush holders and which make contact with the conductive segments on the disc 12. The brushes are arranged with respect to the brush holders so that all six tracks are covered by at least one brush, as will be discussed below. As a practical matter, it will be understood that the tracks comprise the portions of the disc 12 beneath the brushes.

Figure 2:
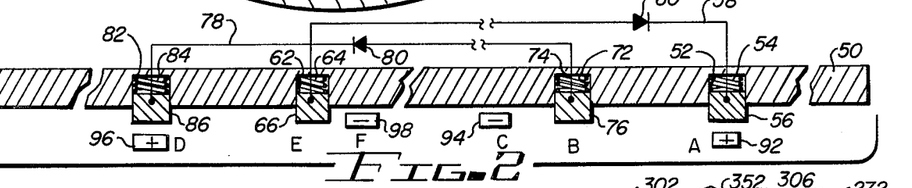
FIG. 2 is a view in partial section of the motor and brush apparatus of FIG. 1 taken generally along line 2—2 of FIG. 1.

FIG. 2 comprises a view in partial section of the brush holder 50, taken generally along lines 2—2 of FIG. 1. Both FIGS. 1 and 2 will be discussed in conjunction with the commutator and brush apparatus 10.

The brush holders 50 and 90 are shown in FIG. 1 in phantom for purposes of clarity to allow the entire surface of the commutator disc 12 to be fully illustrated in conjunction with the segments disposed thereon. Each of the brush holders 50 and 90 is of substantially the same construction, and accordingly the illustration of FIG. 2 with respect to the construction of the brush holder 50 is also applicable to the rush holder 90. However, there are some differences in function between the brush holders. One difference between the brush holders 50 and 90 is the spacing apart of the brushes which each brush holder carries so as to provide a brush over the appropriate tracks on the disc 12. Another difference is the provision of diodes to polarize the current flow between the brushes of brush holder 50. Finally, the brushes of holder 90 are connected to a dc voltage source, such as a battery.

The brush holder 50 includes four recesses, designated respectively by reference numerals 52, 62, 72, and 82. In the recess 52 is a brush 56 which is biased out of the recess 52 by a compression spring 54. In the recess 62 is a brush 66 which is biased out of the recess by a compression spring 64. A conductor 58 extends between the brushes 56 and 66, and is appropriately conductively secured thereto. A diode 60 is secured in the conductor 58, with the anode of the diode 60 connected to the brush 66 and the cathode of the diode 60 connected to the brush 56.

In the recess 72 is a brush 76, and the brush 76 is biased out of the recess 72 by a compression spring 74. In the recess 82 is a brush 86, and the brush 86 is biased out of the recess by a compression spring 84. A conductor 78 extends between the brushes 76 and 86, A diode 80 is electrically connected to the conductor 78, with the anode of the diode 80 connected to the brush 76, and the cathode of the diode 80 connected to the brush 86.

All of the brushes 56, 66, 76, and 86 are conductive, and are made of typical carbon material, well known in the art. It will be noted that the four brushes 56, 66, 76, and 86 are disposed in pairs and the pairs are polarized by a diode in each conductor which extends between each pair of brushes so as to allow for the flow of electrical current in one direction only.

The brush holders 50 and 90 extend diametrically across the disc 12 and at an angular orientation with respect to each other of less than a ninety degree included angle. Assuming a clockwise direction of rotation, as shown by the arrow in FIG. 1, the brush holder 90 leads the brush holder 50 by less than ninety degrees.

The segments 14, 20, 28, 30, 42, and 44 are preferably copper segments etched by well known and understood processes from a solid copper disc disposed on a nonconductive substrate, namely the disc 12. This results in a printed circuit type commutator disc in which the segments are arcuate segments having predetermined configurations with respect to both their arcuate length and their radial width. The segments are electrically isolated from each other, both arcuately and radially, as will be discussed. The segments 20 and 30 are active segments in that they are electrically connected to the armature windings of the rotating armature. The segments 14, 28, 42, and 44 are passive segments, whose primary purpose is to provide a surface on which the brushes may ride.

The segment 14 extends arcuately on the outer track A on the disc 12 over a predetermined arcuate length. The arcuate length of the segment 14 is less than 360°. Between the ends of the segment 14 is an outer portion of the conductive segment 20. A pair of nonconductive gaps 16 and 18 are disposed on track A between the ends of the segment 14 and the A track ends of the conductive segment 20. Conductive segment 20 also extends arcuately along track B for the entire arcuate length of track B, for a full 360°. It is the central portion of the conductive segment 20 which is disposed on track B, with its outer portion disposed on track A between the ends of the segment 14.

The conductive segment 20 also includes an inner portion which is disposed over a predetermined arcuate distance of the track C. A radial gap is also present between the segment 14 and the active conductive segment 20, so that the segment 14 is isolated electrically from the conductive segment 20.

A passive segment 28 is spaced apart radially from the central or track B portion of the arcuate segment 20. The segment 28 extends arcuately from one end of the inner or track C portion of the conductive segment 20 to the other end of the inner or track C portion of the conductive segment 20. The segment 28 is arcuately separated from the track C portion of the conductive segment 20 by a pair of gaps 24 and 26. There is a radial spacing between tracks C and D, and into the radial spacing extends a tab 22 of the conductive segment 20. The tab 22 is an armature winding connection tab, and an appropriate conductor extends from the tab 22 to the windings in the armature.

An outer portion of conductive segment 30 is disposed arcuately on part of the track D. A middle portion of the conductive segment 30 extends arcuately over the entire three hundred sixty degree length of track E. An inner portion of the conductive segment 30 extends arcuately over a portion of the inner track F. The conductive segment 30 includes an armature winding connection tab 32 which extends radially inwardly from the inner or track F portion of the conductive segment 30. An armature winding 100 is shown in phantom in FIG. 1 connected between the tabs 22 and 32.

It will be noted that the drawings do not show the stationary field coils or the connections for the stationary field coils.

The arcuate length of track D not occupied by the outer portion of the conductive segment 30 is occupied by the passive segment 42. The passive segment 42 is separated from the outer or track D portion of the conductive segment 30 by a pair of gaps 34 and 36. The segment 42 is also spaced apart radially from the center or track E portion of the conductive segment 30.

The portion of track F, the inner track, not occupied by the inner or track F portion of conductive segment 30, is covered by the passive segment 44. A pair of gaps 38 and 40 separate the inner portion of conductive segment 30 from the segment 44. The conductive segment 44 is also radially spaced apart from the central or E track portion of the conductive segment 30.

As discussed in the preceding paragraphs, two conductive segments, namely segments 20 and 30, are each disposed over an entire track and over a part of an inner and outer track, adjacent to the complete track which they cover. The segments are respectively arcuately and radially separated from each other. The brushes, disposed in the brush holders 50 and 90, are disposed over the tracks of the conductive discs. The brush holders 50 and 90 are arcuately spaced apart from each other, and are secured in place, to allow for the rotation of the nonconductive disc 12, which is in turn fastened to a motor armature on shaft 48. As is understood, the brushes are spring biased against the conductive segments on the disc 12 to provide positive connection between the brushes and the disc as the disc rotates.

Brush holder 90 includes four brushes which are connected to a battery or other voltage source of direct current. Brushes 92 and 96 are connected to a positive terminal of the voltage source, and brushes 94 and 98 are connected to the negative or return terminal of the voltage source. Brushes 92, 94, 96 and 98 are respectively disposed over tracks A, C, D, and F. This is shown in FIG. 1 and is schematically illustrated in FIG. 2.

Assuming the disc 12 to rotate clockwise, as indicated by an arrow adjacent the outer periphery of the disc, brushes 56 and 92 are in electrical contact with the segment 14 on track A. At the same time, the brush 76 is making contact with the center or central portion of the conductive segment 20 which is disposed on the track B.

With respect to track C, a portion of the conductive segment 20 is disposed on track C and the rest of the track C, except for the gaps 24 and 26, is occupied by segment 28. The brush 94 is disposed over track C and, as shown in FIG. 1, is just beginning contact with the C track portion of conductive segment 20.

A pair of brushes 96 and 86 are disposed on track D, from brush holders 90 and 50, respectively, and they make electrical contact with the outer portion of conductive segment 30 and with passive segment 42, respectively. A single brush 66 is disposed on the E track, and negative brush 98 is disposed on the F track. For the transmission of electrical energy, the brushes 92 and 94, disposed on tracks A and C, are respectively positive and negative, as are brushes 96 and 98, which are disposed on the D and F tracks. The electrical connection to one end of the armature winding 100 is through conductive segment 20 and its armature connection tab 22.

The electrical connection for the other end of the armature winding 100 is through conductive segment 30 and its armature winding tab 32, and the input for the electrical current is alternately through brushes 92 and 96, depending on their location, which are indicated respectively as positive in polarity. Brushes 94 and 98 are negative in polarity, and are connected to the ground or negative return terminal of a dc power supply, such as a battery.

Assuming a location of the respective brushes as indicated in FIG. 1, with brush 92 on segment 14, and brush 94 on conductive segment 20, and brush 96 on conductive segment 30, and brush 98 on segment 44, and further assuming a clockwise rotation of the commutator 10 in the direction indicated by the arrow in FIG. 1, then the brush 96 disposed on the D track portion of conductive segment 30 provides a source of positive voltage for the armature winding 100 connected to the tab 32. The current path to the winding 100 is from tab 32 of segment 30, and the return path is from tab 22 of conductive segment 20. Negative brush 94 is disposed on the track C portion of segment 20.

The brush 96 is in contact with the track D portion of the conductive segment 30 for an arcuate distance of about 120°, or until the end of the conductive segment 30 adjacent the gap 36 is disposed beneath the brush 96. During that arcuate period of time, the brush 96 provides a positive flow of current for the winding connected to the tab 32. The brush 86 will come into electrical contact with segment 30 at track D before brush 96 leaves segment 36 for segment 42. This will provide a reverse bias on the diode 80, to prevent current flow in conductor 78. Brush 96 provides a reverse bias for diode 80 until brush 96 leaves segment 30. When brush 96 leaves segment 30, the magnetic field will collapse. The voltage change created by the collapsing field will forward bias the diode 80, thus providing a current path for the current sustained by the collapsing field. The field will collapse to zero before the brush 86 leaves segment 30 for segment 32 and accordingly there will be no arcing through the brushes.

After the brush 86 leavs conductive segment 30 and makes contact with passive segment 42, which is after the collapse of the magnetic field in the armature winding, the brush 92, which is a positive voltage source, makes contact with the A track portion of conductive segment 20. This results in a reversal of the current flow through the armature coil winding 100 and accordingly causes a reversal of polarity in the magnetic field induced thereby.

The current path through the windings is now from the tab 22 of the conductive segment 20, through the winding 100, and through tab 32 and the conductive segment 30 to the brush 98. The brush 98 makes electrical contact with the F track portion of the segment 30 at the same time the brush 98 makes electrical contact with the A track portion of the conductive segment 20 to complete the electrical circuit through the armature winding 100.

Continued rotation of the disc 12 results in the brush 56 making electrical contact with the A track portion of conductive segment 20. This results in a reverse bias on the diode 60. When brush 92 leaves the A track portion of conductive segment 20 and makes contact with the inactive or passive segment 14, the current flow through the armature winding 100 continues as the field collapses because the diode 60 is forward biased and a current path through conductor 58 is provided between brushes 56 and 66. The field collapses to zero before the brush 56 leaves the conductive segment 20. The field then reverses direction again as the brush 96 makes contact with the D track portion of conductive segment 30, which is the starting condition shown in FIG. 1 and discussed above.

It will be noted that as the field collapses during the interval between each change in voltage polarity, the current induced by the collapsing field flows through the brushes making electrical contact with the conductive strips 20 and 30. There is accordingly a complete current path which effectively accomplishes two things. First, there is no arcing because the diode changes from reverse to forward bias and because positive electrical contact is maintained, providing a complete circuit path. Second, the electrical energy otherwise wasted and destructive as arcing energy is put to a beneficial use as part of the current flowing in the circuit and contributing to the output of the motor, thus increasing the efficiency of the motor.

Figure 3:
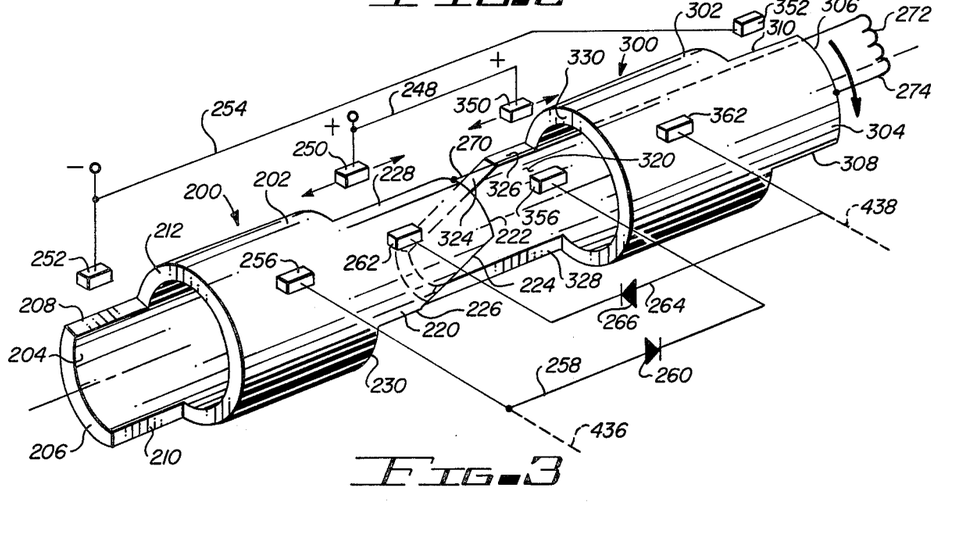
FIG. 3 is a schematic perspective view of an alternate embodiment of the apparatus of FIG. 1.
Figure 4:
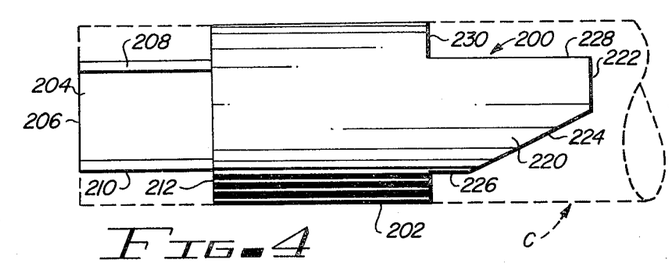
FIG. 4 is a side view of part of the commutator apparatus of FIG. 3.
Figure 5:
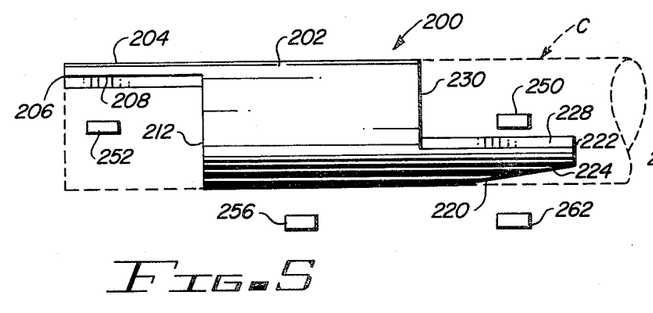
FIG. 5 is a top view of the commutator apparatus of FIG. 4.
Figure 6:
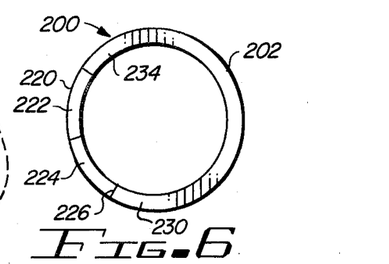
FIG. 6 is a view of one end of the commutator apparatus of FIG. 4.
Figure 7:
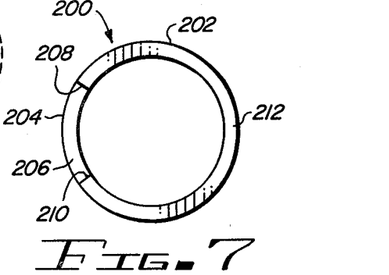
FIG. 7 is an end view of the opposite end of the commutator apparatus of FIG. 4 from that shown in FIG. 6.

FIG. 3 comprises a perspective view of an alternate embodiment of the armature and brush apparatus of FIG. 1. The alternate embodiment of FIG. 3 comprises a pair of cylindrical commutator elements 200 and 300, both of which are secured to a common shaft of a rotating armature, such as to a shaft 48 shown in FIG. 1. The commutator elements 200 and 300 are substantially identical in configuration, but are reversed 180° from each other with respect to their arcuate and axial configurations. FIG. 4 comprises a side view of the commutator 200, and FIG. 5 comprises a top view of the commutator 200. Only the active, conductive portions of the commutators are illustrated and discussed, comparable to the active segments 20 and 30 of FIGS. 1 and 2. The passive portions, which simply provide surfaces on which some of the brushes ride, are not illustrated or discussed. However, a cylinder commutator C, which includes the commutator elements 200 and 300, is partially outlined in phantom in FIGS. 4 and 5. FIGS. 5 and 6 are end views of the commutator 200, with FIG. 6 comprising a right end view and FIG. 7 comprising a left end view. For the general discussion concerning the configuration of the commutator 200, which discussion also pertains to commutator 300, reference will be made to FIGS. 3, 4, 5, 6, and 7.

The commutator 200 includes a cylindrical central portion 202. A rear blade 204 extends rearwardly from the cylinder 202. The blade 204 comprises an arcuate section or segment of the cylinder 202. The arcuate length of the blade 204 is about ninety degrees, or about one-fourth of the total arcuate length of the cylinder 202.

The rear blade 204 includes a rear edge 206, a leading side edge 208, and a trailing side edge 210. The terms "leading" and "trailing" refer to the direction of travel or rotation of the commutator 200, as indicated by the arrow adjacent the commutator 300.

An edge 212 is defined at the rear end of the cylinder 202 at the juncture of the cylinder 202 and the rear blade or segment 204, and between the leading edge 208 and the trailing edge 210 of the segment 204.

Extending forwardly from the cylindrical portion 202, and generally diametrically or oppositely disposed from the rear segment 204, is a forward segment or blade 220. The forward blade 220 includes a front edge 222 which, like the rear edge 206, is substantially perpendicular to the longitudinal axis of the commutator 200. From the front edge 222 to the cylinder 202 are a pair of leading edges, which include a sloping leading edge 224 and a generally straight or axially extending leading edge 226. The leading edge 226 extends from the cylindrical portion 202 of the juncture of the sloping leading edge 224. The sloping leading edge 224 extends from the juncture of the straight edge 226 to the front edge 222.

The forward blade 220 also includes a straight or axially extending trailing edge 228, which extends from the front edge 222 of the blade 220 to the cylinder 202. From the juncture of the trailing edge 228 with the cylindrical portion 202 to the juncture of the leading edge 226 with the cylinder 202, there is an edge 230 on the cylinder 202 which is substantially parallel to the edge 212. The forward blade 220 also extends for an arcuate distance of about ninety degrees, an it is displaced one hundred eighty degrees from the rear blade 204.

The commutator 300 is substantially identical in configuration to the commutator 200, except that it is a mirror image, reversed 180° from the commutator 200. The corresponding sides, edges, and the like for the commutator 300 are substantially the same as with the commutator 200, except that the prefix "2" for the commutator 200 has been replaced with the prefix "3" for the commutator 300. It will be noted that what are "leading" edges for the commutator 200 are also "leading" edges for the commutator 300, and what are trailing edges for the commutator 200, are also trailing edges for the commutator 300. It will be further noted that the front and rear blades for both commutators are disposed one hundred eighty degrees apart from each other, as best shown in FIG. 3, when the commutators are in a use position.

Eight brushes are shown in FIG. 3 as disposed adjacent the commutators 200 and 300. A pair of positive source brushes 250 and 350 are shown disposed adjacent the blades or segments 220 and 320 of the commutators 200 and 300, respectively. The brushes 250 and 350 are both secured to a positive voltage source through a conductor 248 for providing a current for the commutator and for the windings or coils 272 connected to the commutators. A battery or other dc voltage source may be used.

A pair of negative return brushes 252 and 352 are disposed adjacent the blades or segments 204 and 304 of the commutators 200 and 300, respectively. The brushes 252 and 352 are connected together by a conductor 254 which is in turn connected to the negative or return terminal of a battery or other dc source.

Two additional brushes are disposed on each of the commutators, and one brush from each commutator is electrically connected together through a diode. A brush 256 and a brush 356 are disposed from the commutators 200 and 300 respectively, and are electrically connected by a conductor 258. A diode 260 is connected to the conductor 258, with the anode of the diode 260 connected to the brush 256, and the cathode of the diode 260 connected to the brush 356. The brush 256 is disposed on the cylinder 202, while the brush 356 is disposed adjacent the blade or segment 320.

A brush 262 is disposed on the blade 220 of the commutator 200, and a brush 362 is disposed on the cylinder 302 of the commutator 300. The brushes 262 and 362 are connected together by a conductor 264. A diode 266 is connected to the conductor 264, with the anode of the diode 266 connected to the brush 362, and the cathode of the diode 266 connected to the brush 262.

The diodes 260 and 266 polarize the current flow between the brushes 256 and 356, and between the brushes 262 and 362, respectively. A conductor 270 is electrically connected to the cylinder 202 of the commutator 200. The conductor 270 extends to the winding 272 of the armature of the motor in which the commutator apparatus of FIG. 3 is secured. The winding 272 schematically represents the armature windings, which may be any number, for purposes of illustration of the apparatus of the present invention. The winding 272 is connected to the commutator 300 by a conductor 274. Thus, the winding 272 is directly connected to both the commutator 200 and the commutator 300.

It is understood that the brushes illustrated in FIG. 3 are spring biased against their respective commutators for positive electrical contacts, and that the commutators 200 and 300 are made of conductive material, such as brass, steel, copper, or the like. It is further understood that the cylindrical commutators 200 and 300 are insulated from the armature shaft to which they are appropriately secured for relative motion with respect to the fixed brushes. It is also understood that only the active, conductive portions of the commutators 200 and 300 are illustrated, and that the passive portions on which the brushes ride when the brushes are not in electrical contact with the commutators 200 and 300 are not shown. Obviously, the brushes are disposed against insulated elements when they are not in electrical contact with the active or conductive elements of the commutators, similar in function to the passive segments of FIG. 1.

The brushes are shown in FIG. 3 as being adjacent various portions of the commutators, which are shown in perspective in FIG. 3. The brushes 250 and 262 are generally parallel in alignment to each other and accordingly are on the same "track" with respect to the commutator blade 220 of the commutator 200. Similarly, the brushes 350 and 356 are in parallel alignment and accordingly ride on the same "track" or surface of the commutator blade 320 of the commutator 300. The brushes 250, 262, and 350, 356, are radially displaced from each other, although axially aligned.

The brush 252 is axially aligned to make contact with the rear blade 204, while the brush 256 is axially aligned to make constant contact with the cylindrical portion 202 of the commutator 200. The brush 362 is axially aligned to make constant contact with the cylindrical portion 302 of the commutator 300, and the brush 352 is axially aligned to make contact with the blade 304 of the commutator 300. As indicated above, the blades 204 and 304 are disposed 180° apart, as are the blades 220 and 320.

The alignment of the four brushes associated with the commutator 200 are schematically represented in FIG. 5. The brush 252 is shown aligned with the blade or tail segment 204 of the commutator 200, while the brushes 250 and 262 are shown aligned with the front blade or segment 220 of the commutator 200. The brush 256 is shown aligned with the cylindrical portion 202 of the commutator 200. It will be understood that the brush 256 makes contact with the cylindrical portion 202 of the commutator 200 through an entire 360° of rotation of the commutator 200. However, since the blades or segments 204 and 220 are not cylindrical, but rather comprise only arcuate sections of the cylinder, the brushes aligned with those portions of the commutator 200 will make contact with the commutator 200 for an arcuate distance corresponding to the arcuate length of the portions of the commutator that they are aligned with. For example, the arcuate length of the blade 204 is about 90°, and accordingly the brush 252 makes contact with the commutator 200 only for an arcuate length of 90°. The brush 256 makes continuous contact throughout the entire 360° portion of the cylinder 202. The brushes 250 and 262 are in contact with the blade 220 over the arcuate length of the blade 220 that they are aligned with. Since the blade 220 includes a sloping edge 224 and a straight or axially extending edge 228, the arcuate length of the blade 220 varies from a minimum at the front edge 222 to a maximum adjacent the straight edge portion 226. The axial displacement or orientation of the brushes 250 and 262 with respect to the blade 220 will accordingly determine the length of time, or arcuate distance, that they are in contact with the commutator 200.

In FIG. 3, there are arrows adjacent the brushes 250 and 350, which arrows are oriented in an axial relationship with respect to the commutators 200 and 300. By varying the axial placement of the brushes 250 and 350, the "on" time of the commutators may be varied. That is, the brushes 250 and 350 may be moved axially with respect to the blades 220 and 320 to vary, either lengthen or shorten, the time that the source of positive current is connected to the commutators 200 and 300.

FIGS. 8A, 8B, 8C, and 8D are consecutive views of the commutators 200 and 300, with views in partial section through the commutators at the area where the brushes are disposed. The commutators are rotating clockwise, as indicated by the arrows in the Figures, with FIG. 8A comprising the condition or location of the commutators as shown in FIG. 3, and FIGS. 8B, 8C, and 8D comprising consecutive 90° of rotation of the commutators or commutator elements.

Each of the FIGS. 8A, 8B, 8C, and 8D include three views in partial section of the commutator 200 and three views in partial section of the commutator 300, illustrating the orientation of the brushes with respect to the particular commutator with which they are associated. The conductors 258 and 264, and the diodes 260 and 266 are also shown in each drawing. The commutators are hatched if the section line cuts through a solid portion of the commutator at the location of the brushes at the time the particular figure is taken. It will be noted that in each drawing the commutator 200 is on the upper portion, while the commutator 300 is on the bottom portion. The blades 204 and 304 are shown as each having a ninety degree arcuate length, and the blades 220 and 320 are shown as each having less than a ninety degree arcuate length where their respective brushes are located. Furthermore, the brush pairs 250, 262 and 350, 356 are shown disposed apart less than ninety degrees, and less than the arcuate length of the blade portions that they are disposed against.

Figure 8A:
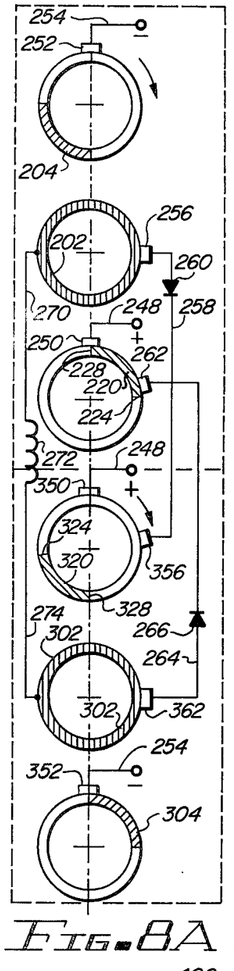
FIGS. 8A, 8B, 8C, and 8D are multiple sequential schematic views of the apparatus of FIG. 3 taken through portions of the commutator apparatus of FIG. 3, and showing the sequential rotation of the commutator and the electrical circuitry pertaining thereto.

In FIG. 8A, the brush 250 is making contact with the blade 220 of the commutator 200. Accordingly, current flows through the brush 250 to the cylinder 202 of the commutator 200, and from the commutator 200 through conductor 270, through the winding 272, and to the cylinder 302 of the commutator 300. The return brush 352 is in contact with the blade 304 of the commutator 300 to provide a return path for the current flow through the commutator 300.

Figure 8B:
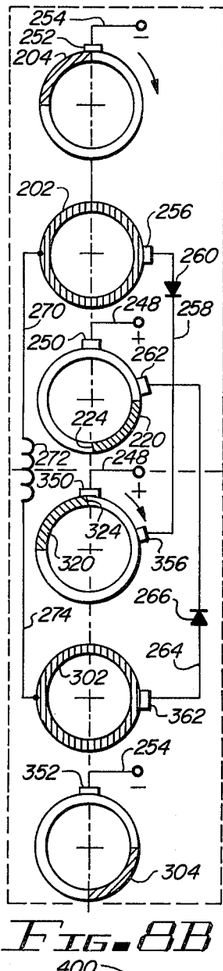

After ninety degrees of rotation of the commutators 200 and 300 shown in FIG. 8A, the commutators and brushes are at the position shown in FIG. 8B. The brush 350 is just beginning to make contact with the blade 320 of commutator 300, to provide a source of positive current for the commutators. The current flow accordingly is from the commutator 300, through the conductor 274, the windings 272, and the conductor 270, to the commutator 200. The brush 252 is in contact with the blade 204, and thus provides a return path through the common conductor 254. The current flow to the winding 272 is accordingly reversed between FIGS. 8A and 8B.

Figure 8C:
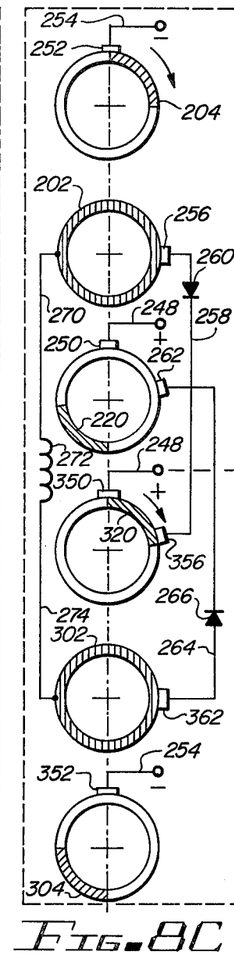

FIG. 8C illustrates the situation when the commutators 200 an 300 have continued to rotate or have rotated another 90° from that shown in FIG. 8B. A source of positive current through brush 350 is applied through the commutator 300, since the brush 350 is at the trailing edge of the blade 320. Current flow is accordingly to the winding 272 through the conductor 274, and through conductor 270 to the commutator 200. The brush 252 is still in contact with the blade 204 to provide a current path to the common conductor 254.

Figure 8D:
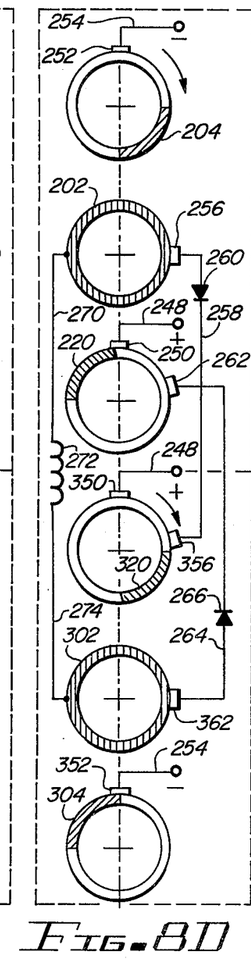

Another ninety degrees sequential rotation of the commutators 200 and 300 is illustrated in FIG. 8D. The brush 250, which is connected to a source of positive current, through conductor 248, is beginning to make contact with the blade 220 and accordingly current flow through the commutator 200 to the winding 272 is through conductor 270, and the return flow is to the commutator 300 by the conductor 272. The current flow has again reversed between FIGS. 8C and 8D. From the commutator 300, the current path is through the blade 304 and the brush 352 to the common return conductor 254. The diodes 260 and 266 block the reverse flow of current between the commutators 200 and 300, and allow the current to flow only in one direction.

In FIG. 8A, the blade 220 of the commutator 200 is beginning to rotate from under the input brush 250. With the input brush 250 still bearing against the blade 220, the current path through the winding 272 is from the blade 220 to the cylinder 202, the conductor 270, the winding 272, the conductor 274, and the cylinder 302 of the commutator 300. The current flows through the cylinder 302, to the blade 304, and through the brush 352 to the return conductor 254.

When the brush 262 comes into contact with the segment 220, while the input brush 250 is in contact with the commutator, there is a reverse bias on the diode 266. When the brush 250 breaks contact with the blade 220, the field through the winding or coil 272 begins to collapse. As the field collapses, the voltage potential changes and forward biases the diode 266, thus providing a current path in the same direction, which adds to the rotation of the armature. The current flow from the collapsing field goes to zero before the blade 220 rotates away from the brush 262. This occurs between the states shown in FIG. 8A and FIG. 8B.

The next cycle begins when the brush 350 contacts the blade 320. The brush 350 then becomes the input brush for the current flowing through the input conductor 248, the blade 320, the cylinder 302, the conductor 274, and the winding 272. From the winding 272, the current flows through the conductor 270 to the cylinder 202 and the blade 204. From the blade 204, the current flows to the return conductor 254 through the brush 252.

In FIG. 8B, the input brush 350 is just beginning to make contact with the blade 320. Accordingly, the reverse field from that shown in FIG. 8A is beginning in FIG. 8B. It will be noted that the collapse of the field which resulted when the blade 220 rotated away from the input brush 250 of FIG. 8A, resulted in a current flow in the opposite direction to the current flow just beginning in FIG. 8B, with the input brush 350 providing the input current to the winding 272.

When the brush 356 makes contact with the blade 320, a reverse bias is applied to the diode 260. This is shown in FIG. 8C. As long as the input brush 350 maintains electrical contact with the blade 320, the reverse bias is maintained on the diode 260. At such time as the blade 320 rotates away from the input brush 350, the field through the winding 272 begins to collapse, and the reverse bias is removed from the diode 260. Instead, the voltage potential changes, forward biasing the diode 260. The collapsing field through the winding 272 induces a current in the direction of the current flow provided by the current flowing through the input brush 350. The forward bias of the diode 260 accordingly provides a path for the current flow from the current induced by the collapsing field. The collapse of the field, and the current induced thereby, is completed, with the current flow diminishing to zero before the blade 320 rotates away from the brush 356.

Continued rotation of the commutators 200 and 300 brings the blade 220 again into electrical contact with the brush 250 which thus becomes the input brush for the current flowing through the conductor 258. The current flow, as illustrated in FIG. 8D, is once again from the brush 250 through the blade 220 to the cylinder 202, and to the conductor 270 and through the winding 272. From the winding 272 the current flows through the conductor 274 to the cylinder 302 and the blade 304 which is again in electrical contact with the brush 352. It will be noted that the blades 304 and 220 are generally in parallel, axial alignment. From the brush 352, the current flows through the return conductor 354.

The termination of the cycle illustrated in FIG. 8D is shown in FIG. 8A, and is discussed above. As the blade 220 begins to make contact with the brush 262, a reverse bias is applied to the diode 266, and the reverse bias on the diode 266 continues until the blade 220 rotates away from contact with the input brush 250. At such time, the voltage potential changes to forward bias the diode 266. The diode 266 then provides a current path for the current flow from the collapsing field of the winding 272, all as discussed above.

As is illustrated in FIGS. 8A, 8B, 8C, and 8D, the blades 220 and 320 comprise an arcuate distance of about ninety degrees. The trailing edges 228 and 328 of the blades 220 and 320, respectively, are shown substantially aligned on the 90° index markers in each of the Figures, while the sloping leading edges 224 and 324 are illustrated in the Figures as comprising an arcuate distance of less than 90°. The overall arcuate length of the respective input blades 220 and 320 is 90°, and the straight or aligned edges 226 and 326 are respectively illustrated as being oriented on a 90° index marker in the Figures.

FIGS. 9A, 9B, 9C, 9D, 9E and 9F comprise consecutive schematic drawings of the equivalent circuits discussed above in conjunction with FIGS. 8A, 8B, 8C, and 8D. The reference numerals pertaining to the winding 272 and the diodes 260 and 266 and the conductors associated therewith have been used in FIGS. 9A...9F in conjunction with the particular event transpiring in the circuitry. In the Figures, a switch is used to designate electrical contact between an input brush and a commutator. The positive and negative terminals in the Figures are designated by the reference numerals pertaining to the conductors 248 and 254, which respectively comprise the conductor connected to the positive or input terminal of a voltage source and extends to the positive input brushes, and the conductor which extends from the negative or return terminal of a voltage source and the negative or return brushes. The movable switch contact in the Figures is identified by the reference numeral of the appropriate brush, whether an input brush or a return brush.

Figure 9A:
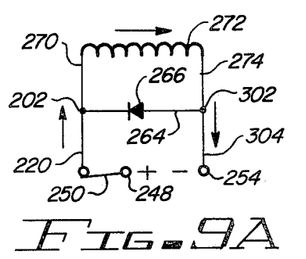
FIGS. 9A, 9B, 9C, 9D, 9E, and 9F are sequential schematic diagrams illustrating the equivalent circuitry involved in the commutator and brush relationship illustrated in FIGS. 8A, 8B, 8C, and 8D.

In FIG. 9A, a switch (brush) 250 is shown providing electrical connection between a positive voltage source 248 and a conductor (blade) 220, wich is in turn connected to a tie point (cylinder) 202. From the tie point 202, a conductor 270 extends to one side of a coil or winding 272. From the other side of the coil or winding 272, a conductor 274 extends to a tie point (cylinder) 302. From the tie point 302, a conductor 264 extends to the anode of a diode 266. The cathode of the diode 266 extends to the tie point 202. Another conductor (blade) 304 extends from the tie point 302 to a negative terminal 254.

The current flow through the coil 272 is indicated by an arrow disposed adjacent the coil or winding 272. The diode 266 is reverse biased by the voltage potential between the conductor 220 and the conductor 304. However, as shown in FIG. 9B, when the switch 250 is opened, the reverse bias is removed from the diode 266, by the change in potential, allowing the current from the collapsing field from the coil 272 to flow through the diode 266.

Figure 9B:
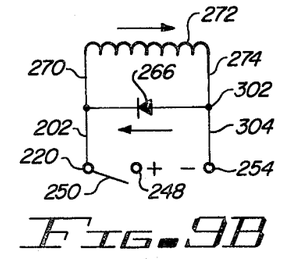
Figure 9C:
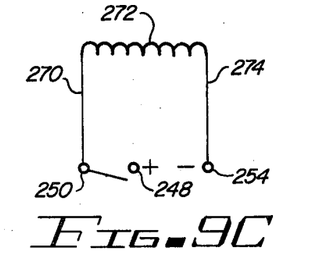

In FIG. 9C, with the switch 250 remaining open, once the field collapses, there is no current flow through the coil 272 and the circuit remains open until it is again closed.

Figure 9D:
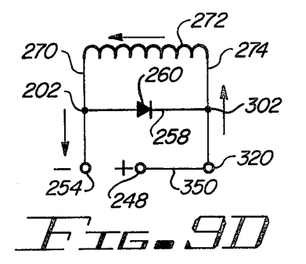

In FIG. 9D, the polarity of the input voltage is reversed from that shown in FIGS. 9A, 9B, and 9C. The positive input terminal 248 is shown in FIG. 9D as connected by a switch (brush) 350 to a terminal (blade) 320, which is connected to a tie point (cylinder) 302. From the tie point 302, a conductor 274 extends to one side of the coil or winding 272. From the other or opposite end of the coil or winding 272 the conductor 270 extends to a tie point 202. Between the tie point 302 and the tie point 202 is a conductor 258 and a diode 260. The anode of the diode 260 is connected to the tie point 202, while the cathode of the diode 260 is connected to the tie point 302. The tie point 202 is connected to the negative or return terminal 254 by a conductor (blade) 204.

Figure 9E:
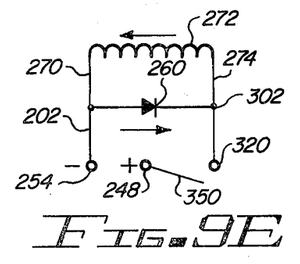

As long as the switch 350 extends between the positive input terminal 248 and the terminal 320, the current flow through the coil or winding 272 is as illustrated in FIGS. 9D and 9E. The diode 260 is reverse biased and accordingly no current flow through the diode. However, when the switch 350 is open, as shown in FIG. 9E, the reverse bias is removed from the diode 260 and it is forward biased by the change in voltage potential. A current path is thus established for the current flow resulting from the collapsing field.

Figure 9F:
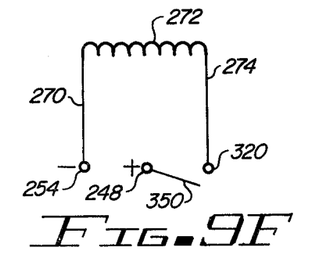

After the field collapses, the current drops to zero and there is no further current flow through the winding 272. The circuit simply remains open, as shown in FIG. 9F.

It will be understood that the current flow from the collapsing field is in the same direction as the current flow from the closed, active circuit, and the current path through a diode allows the current flow to drop to zero and prevents arcing between the commutator surface and a brush. Furthermore, the current contributes in a positive manner to the rotation of the armature. Thus, the energy that is otherwise wasted in arcing is captured and is put to use, increasing the efficiency of the motor in which the apparatus is installed.

The apparatus discussed above, and shown in the drawing, "switch" the voltage, and thus the current, twice for three hundred sixty degrees of shaft revolution. Other switching times may also be accomplished by altering the configuration, or arcuate length, of the active commutator segments and the number of commutator elements.

Figure 10:
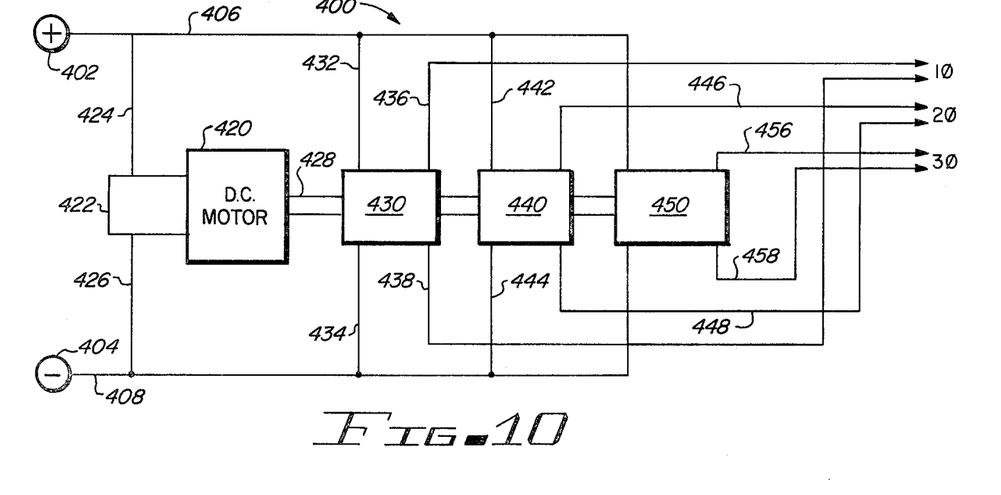
FIG. 10 is a schematic illustration of the employment of the apparatus of the present invention used as an inverter.

FIG. 10 comprises a schematic illustration of the apparatus of the present invention used as an inverter, to change direct current into a form of alternating current. FIG. 10 schematically utilizes three commutators 430, 440, and 450 to provide three phase alternating current.

A source of direct current, represented by a positive terminal 402 and a negative terminal 404, which comprise part of the inverter apparatus 400, is shown connected to a dc motor 420 and to the three commutators 430, 440, and 450. The motor 420 includes its own commutator 422 secured to one end of the motor and an output shaft 428 extending from the opposite end of the motor, remote from the commutator 422. A pair of source conductors 406 and 408 are connected to the terminals 402 and 404, respectively, and extend to the commutator 450. Three conductors are connected to each of the source conductors 406 and 408 and extend to the other three commutators, including the commutator 422 which provides the operating current for the motor 420. A conductor 424 extends from the conductor 406 to the commutator 422, and a conductor 426 extends from the conductor 408 to the commutator 422. The commutator 422 is substantially the same as the commutators discussed above in conjunction with FIGS. 3-8. Obviously, if desired, a disc type commutator, such as commutator 10 of FIGS. 1 and 2 may be employed instead of the cylinder type commutator of FIGS. 3-9.

The three output commutators 430, 440, and 450 are all secured for common rotation of the output shaft 428 of the motor 420. Since the motor 420 drives only the output shaft 428, and the commutators secured thereto, it is obvious that the motor 420 may be a relatively small, fractional horsepower motor.

A conductor 432 and a conductor 434 extend to the input brushes of the commutator 430 from the conductors 406 and 408, respectively. Another pair of conductors 442 and 444 extend from the conductors 406 and 408, respectively, to the input brushes of the commutator 440. As has been previously stated, the conductors 406 and 408 extend directly to the input brushes of the commutator 450.

Each of the commutators 430, 440, and 450 includes a pair of output conductors, respectively indicated by reference numerals 436 and 438 for the commutator 430, reference numerals 446 and 448 for the commutator 440, and reference numerals 456 and 458 for the commutator 450.

The input current to the commutators 430, 440, and 450, as well as for the commutator 422, is substantially as described above, primarily in conjunction with FIGS. 3-8. That is, brushes for both the positive line and the return line for each of the commutators, are connected by the previously identified conductors to the source conductors 406 and 408.

The output from the respective commutators 430, 440, and 450, vary from the output illustrated and discussed in conjunction with FIGS. 3-8 because the commutators of FIG. 10 are not hard wired to an armature coil (or coils) within a motor. Rather, in place of the hard wiring, a pair of output leads, one for each commutator element or section, such as one pair for the commutator 430, one pair for the commutator 440, and one pair for the commutator 450, is employed and is connected to the respective output conductors extending from the commutators 430, 440, and 450. For such modification, an additional lead is employed on each cylinder portion of a commutator element, such as the cylinder portions 202 and 302, shown best in FIG. 3. The additional leads provide constant contact with each commutator section or element. These pairs of output leads comprise the respective output conductors, such as the output conductors 436 and 438 for commutator 430, output conductors 446 and 448 for the commutator 440, and output conductors 456 and 458 for the commutator 450. The connection of the output leads 436 and 438 is illustrated in FIG. 3. The leads 436 and 438 are shown in phantom connected between the brushes and the diodes to the conductors 258 and 264, respectively.

It will be understood that each complete commutator includes two commutator sections or elements or halves, such as shown in FIG. 3. For example, the commutator element 200 comprises one-half of the total commutator, and the commutator element 300 of FIG. 3 comprises the other commutator half or commutator element. Together, both commutator elements 200 and 300 are required for a single motor, such as the motor 420, and are thus included in the commutator 422 secured thereto. Similarly, each of the commutators 430, 440, and 450 include the two commutator halves or elements to provide the output from each commutator which is an alternating current output.

Since, as discussed above, the current flow through the armature winding 272, illustrated and discussed in conjunction with FIGS. 3 and 8A . . . 8D, reverses as the commutator sections or elements 200 and 300 rotate, the conductors 270 and 274 connected to the winding or coil 272 alternately transmit or conduit an electrical current of opposite polarity. Thus, if the motor to which the commutator apparatus is secured rotates at a certain, predetermined speed, there will be reversals in The polarity of the electric current at a specific rate. This reversal rate comprises the frequency of the reversal rate, or the cycles per second (hertz) at which the current changes. If the motor 420 runs at a fixed, predetermined, rpm, the reversing of the polarity of the output of each of the commutators 430, 440, and 450 will also be at a fixed, predetermined rate. For example, with two changes of polarity during each revolution, to provide a full cycle of positive and negative polarity, rotating the motor 420 at 3600 rpm will provide an alternating current of sixty cycles per second (60 Hz) from each of the commutators 430, 440, and 450. Accordingly, if ordinary single phase 60 Hz alternating current is desired, then only a single commutator, such as commutator 430, which includes two commutator sections, may be used. However, if three phase alternating current is desired, then the commutators 430, 440, and 450 may all be used, with each commutator secured to the shaft 420 one hundred twenty degrees apart from each other on the shaft 428. With 120° of spacing or separation, three phase ac current is provided.

FIG. 10 schematically illustrates the use of the three commutators 430, 440, and 450 to provide three-phase electric current. The first phase is provided by the output conductors 436 and 438 of the commutator 430. The commutator 440 is secured to the output shaft 428 of the motor 420 one hundred twenty degrees behind the commutator 430, and the second phase is accordingly provided by the output conductors 446 and 448 of the commutator 440. The commutator 450 is secured to the output shaft 428 of the motor 420 one hundred twenty degrees behind the commutator 430, and the second phase is accordingly provided by the output conductors 446 and 448 of the commutator 440. The commutator 450 is secured to the output shaft 428 of the motor 420 one hundred twenty degrees after the commutator 440, which is also one hundred twenty degrees before the commutator 430. The third phase is accordingly provided by the output conductors 456 and 458 of the commutator 450.

It will be understood that the voltage potential across the output conductors of each of the commutators depends on the voltage potential across the terminals 402 and 404 of the input source. If an alternating current at one hundred fifteen volts is desired, then the input source will have to provide one hundred fifteen volts. For three-phase current, as illustrated in FIG. 10, the input source will typically be two hundred thirty volts, or more.

For ordinary household single phase current, only one output commutator such as commutator 430, is required. In such a situation, the commutators 440 and 450 would, of course, not be included with the apparatus. Three output commutators are shown in FIG. 10 to provide an example of inverter apparatus which may provide a three-phase alternating current.

Figure 11:
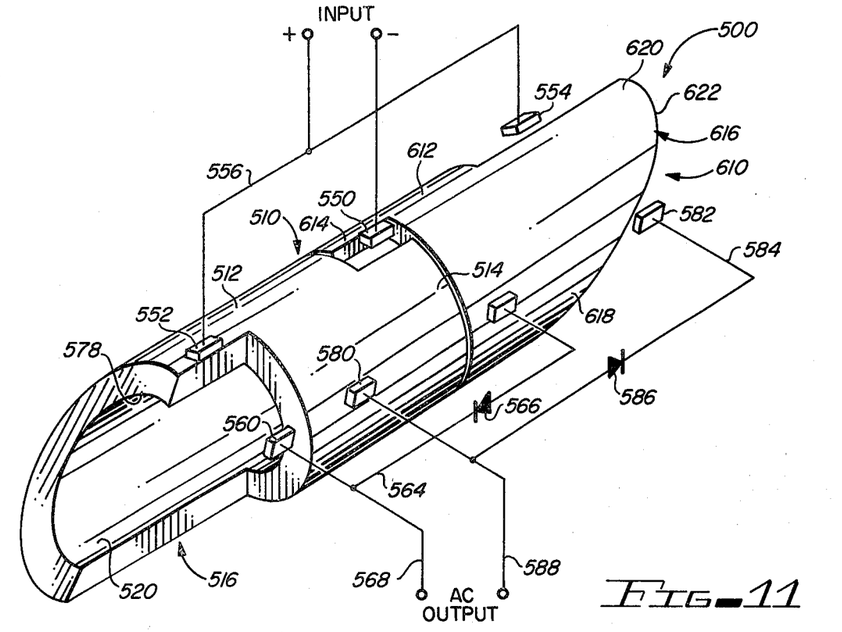
FIG. 11 is a perspective view of an alternate embodiment of the apparatus of the present invention.
Figure 12:
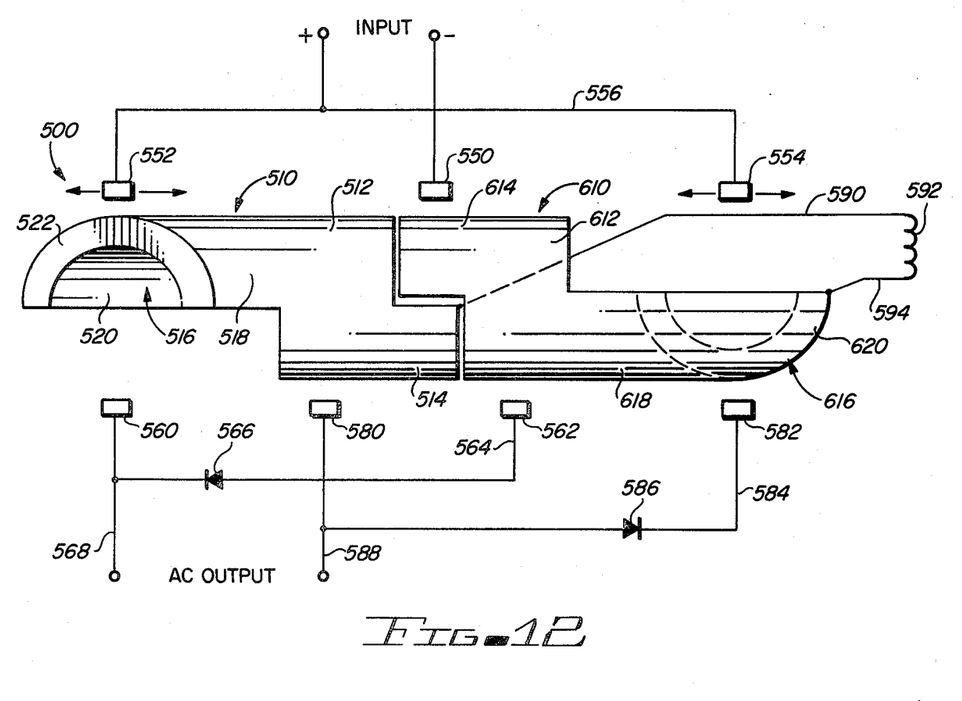
FIG. 12 is a top view of the apparatus of FIG. 11.

FIG. 11 is a perspective view of an alternate embodiment of the apparatus of the present invention. It comprises a perspective view of commutator and brush apparatus 500. FIG. 12 is a top view of the commutator and brush apparatus 500 of FIG. 11. FIGS. 11 and 12 disclose a pair of commutator elements 510 and 610 which comprise modified cylindrical commutator elements, similar to the apparatus of FIGS. 3–7, and 8A–8D. The primary difference between the commutator elements of FIGS. 11 and 12 is that the commutator elements 200 and 300, best shown in FIGS. 3–5, have been rearranged so that a single negative input brush may be used instead of the two input brushes 252 and 352 illustrated in FIGS. 3–5. It will be noted that in FIGS. 11 and 12, only the conductive portions of the commutator apparatus, namely the commutator elements 510 and 610, are shown. The nonconductive portions which complete the cylindrical commutators of the commutator apparatus 500 are not shown in FIGS. 11 and 12. Rather, they have been eliminated for purposes of clarity. Moreover, the brush elements, with their diodes, are shown only schematically in FIGS. 11 and 12, as they are also shown in FIGS. 3, 4, and 5 for the commutator elements 200 and 300. For the following discussion concerning the commutator and brush apparatus 500, reference will be made to both FIGS. 11 and 12.

The commutator element 510 is of a generally cylindrical configuration, modified to provide the appropriate geometric configuration for the arcuate surface of the element with which brushes will be in contact as the element rotates about its longitudinal axis. The commutator element 510 includes a cylindrical portion 512 which extends for a full three hundred sixty degrees of angular or arcuate rotation. The commutator element 510 also includes two other portions, including a front blade 514 which extends forwardly (to the right as shown in FIGS. 11 and 12) from the cylindrical portion 512. The front blade 514 extends arcuately for less than one hundred eighty degrees.

The commutator element 510 also includes a rear blade 516 which extends rearwardly (to the left, as shown in FIGS. 11 and 12) from the cylindrical portion 512. The blade 516 extends arcuately for greater than 180°. The arcuate length of the blades 514 and 516 together is about 360°.

The blade 516 includes two portions, including a forward blade portion 518 which is cylindrical in general configuration, and a rear portion 520 which is not cylindrical, but rather which extends arcuately for a continuously varying amount with respect to its axial length due to a sloping edge 322. The forward blade portion 518 of the rear blade 516 extends for its full, predetermined arcuate length over a fixed or predetermined axial length of the commutator element 510. From the forward blade portion 518, the edge 522 is cut at an angle with respect to the axial length of the element 510 and which accordingly varies the arcuate length of the rear blade portion 520 from a maximum, at the juncture of the rear blade portion 520 with the forward blade portion 518, to a minimum at the rear or outer end of the element 510 remote from the forward blade portion 518.

The commutator element 610 is substantially identical to the commutator element 510 except that it is an inverted mirror image thereof. The commutator element 610 also includes three portions, a cylindrical portion 612 which extends arcuately for a full 360° and for a predetermined axial length, which is substantially identical to the axial length of the cylindrical commutator portion 512 of the commutator element 510.

The commutator element 610 also includes two blades, a rear blade 614 and a forward blade portion 616. The rear blade 614 extends rearwardly (to the left as shown in FIGS. 11 and 12) from the full cylindrical portion 612. The rear blade 614 extends arcuately for less than 360° for a predetermined axial length, which is substantially the same axial length as the forward blade 514 of the commutator element 510. As shown in FIGS. 11 and 12, the commutator blades 514 and 614 are overlapping or interleaving axially with a predetermined arcuate spacing between them. The forward blade 514 and rear blade 614 thus rotate about a common center of rotation on the axis of rotation of the commutator apparatus 500.

Extending forwardly from the full cylindrical portion 612 is the forward (to the right as shown in FIGS. 11 and 12) blade 616. Like the rear blade 516 of the commutator element 510, the forward blade 616 includes two portions, a blade 618 which extends axially for a fixed, predetermined arcuate length, and a blade portion 620 which extends arcuately a varying amount as it extends axially away from (or forwardly) the blade 618. An edge 622 extends arcuately and axially forward from the blade portion 618 to define the arcuate extent of the blade portion 620. The edge 622 corresponds to the edge 522 of the blade 516 of the commutator element 510.

The forward blade 616 may extend arcuately greater than 180°, as may the rear blade 516. There accordingly may be an arcuate overlap between the blades 516 and 616, just as there may be an arcuate gap between the blades 514 and 614. However, the blades 514 and 516 define a full 360° length of arc, and the blades 614 and 616 define a full 360° arcuate length.

The blade 514 and 516 are diametrically opposed from each other, as are the blade 614 and 616. The curved edges 522 and 622 are also diametrically opposed to each other and they extend in opposite directions. Thus, the minimum arcuate lengths of the blade portions 520 and 620 are substantially 180° apart.

The blades 514 and 516 are also diametrically opposed, as are the blades 614 and 616, of the elements 510 and 610, respectively.

A single negative or return input brush 550 is disposed on or over the interleaved front blade 514 and the rear blade 614 of the commutator elements 510 and 610, respectively. Only a single negative input brush is required for the commutator and brush apparatus 500, as opposed to the two negative input brushes required in the embodiment of FIGS. 3, 4, and 5. The axial lengths of the blades 514 and 614 are sufficient to allow the brush 550 to rest thereon as the commutator apparatus 500 rotates about its cylindrical axis. The arcuate spacing between the blades 514 and 614 is sufficient to allow the brush 550 to rest thereon as the commutator apparatus 500 rotates about its cylindrical axis. The arcuate spacing between the blades 514 and 614 is sufficient to allow the brush 550 to completely clear one blade (or commutator element) before it makes contact with the next blade. At the same time, the axial spacing between the commutator elements 510 and 610 is sufficient to prevent arcing or shorting between them. Thus, the brush 550 is disposed alternately on the blades 514 and 614 as the commutator apparatus 500 rotates.

Two positive input brushes 552 and 554 are connected by a conductor 556. The brush 552 is disposed over the blade 516 of the commutator element 510, and the brush 554 is positioned over the blade 616 of the commutator element 610. The brushes 552 and 554 are movable axially so that their "on" time with respect to the blades 516 and 616 may be varied, as desired. The greater the "on" time for the brushes 552 and 554, the closer they will be together. Their maximum "on" time is when they are disposed on the cylindrical portions 518 and 618, respectively. Their minimum "on" time will be when they are spaced apart maximum axially and disposed on the outer ends of the blade portions 520 and 620, respectively.

A pair of output brushes 560 and 562 are connected together by a conductor 564 and a diode 566. An output conductor 568 is in turn connected to the conductor 564. The brush 560 is disposed over the blade 516 of the commutator element 510, while the brush 564 is disposed over the cylindrical portion 612 of the commutator element 610. The brush 562 is accordingly in contact with the commutator element 610 for an entire 360° of revolution of the apparatus 500. However, the "on" time of the brush 560 varies according to its specific axial location with respect to the blade 516.

Another pair of output brushes 580 and 582 are connected together by a conductor 584 and a diode 586. An output conductor 588 is in turn connected to the conductor 584. The output brush 580 is disposed on the cylindrical portion 512 of the commutator element 510. It accordingly is "on" for a full 360° of arcuate rotation of the commutator apparatus 500. The brush 582 is disposed on the blade 616 of the commutator element 610, and its "on" time varies according to the axial location of it with respect to the blade 616.

As is understood, the functioning of the various brushes, diodes, and conductors of the commutator apparatus 500 is substantially the same as has been discussed above, with respect to the embodiment of FIGS. 3–7 and 8A, 8B, 8C, and 8D, and as discussed further in conjunction with FIGS. 9A–9F with respect to the current paths, the biasing of the diodes, etc.

The two commutator elements 510 and 610 are connected to an armature winding(s) or coil(s) 592 by a pair of conductors 590 and 594, respectively, shown only in FIG. 12. As with FIG. 3, the coil(s) or winding(s) 592 is shown only schematically, and it may have any desired number of coils or windings.

It will be noted that the blade angles with respect to the edges 522 and 622 of the blades 516 and 616, respectively, are different from the corresponding angles in the embodiment of FIGS. 3–5. Moreover, the arcuate extension of the blade portions 514, 614 and 518, 618 are different from the embodiment of FIGS. 3–5. It will be understood that the two embodiments included in FIGS. 3–5 and 11, 12 are illustrative only and the various angles and blade portions involved in the embodiments may be varied in accordance with the desired output from the apparatus. Furthermore, both embodiments illustrated are concerned with only a single cycle for each revolution. The blades may be configured, if desired, to provide for more than one cycle per revolution.

What is claimed is:

1. Commutator and brush apparatus for an electric motor having a rotating shaft, comprising in combination:

first conductive means secured for rotation on the motor shaft, including
   a first conductive portion extending arcuately for three hundred sixty degrees,
   a second conductive portion extending arcuately for substantially less than three hundred sixty degrees, and
   a third conductive portion disposed generally arcuately opposite from the second conductive portion and extending arcuately for substantially less than three hundred sixty degrees;
   second conductive means secured for rotation on the motor shaft with the first conductive means and electrically isolated from the first conductive means, including
   a fourth conductive portion extending arcuately for three hundred sixty degrees,
   a fifth conductive portion extending arcuately for substantially less than three hundred sixty degrees, and
   a sixth conductive portion disposed generally arcuately oppositely from the fifth conductive portion and extending arcuately for substantially less than three hundred sixty degrees;
   output means connected to the first and second conductive means;
   input brush means disposed on the first conductive means for providing a current for the output means during a first portion of each three hundred sixty degree rotation of the shaft, and disposed on the second conductive means for providing a current for the output means during a second portion of each three hundred sixty degree rotation of the shaft;
   return brush means disposed on the second conductive means for providing a return path for the electrical current from the output means and from the input brush means during the first portion of each three hundred sixty degree rotation of the shaft, and disposed on the first conductive means for providing a return path during the second portion of each three hundred sixty degree rotation of the shaft;
   first diode brush means connected to the first and second conductive means for providing a current return path from the second conductive means to the first conductive means during a third portion of each three hundred sixty degree rotation of the shaft; and
   second diode brush means connected to the first and second conductive means for providing a current return path from the first conductive means to the second conductive means during a fourth portion of each three hundred sixty degree rotation of the shaft.

2. The apparatus of claim 1 in which the input brush means includes
   a first input brush disposed on the third conductive portion during the first portion of rotation, and
   a second input brush disposed on the fifth conductive portion of the second conductive means during the second portion of rotation.

3. The apparatus of claim 2 in which the first and second conductive means include cylindrical portions spaced apart from each other and coaxially aligned on a motor shaft.

4. The apparatus of claim 3 in which the second and third conductive portions and the fifth and sixth conductive portions each extend arcuately less than ninety degrees.

5. The apparatus of claim 3 in which the second and third conductive portions of the first conductive means and the fifth and sixth conductive portions of the second conductive means each include leading and trailing edges.

6. The apparatus of claim 5 in which the trailing edge of the third conductive segment is spaced apart from the leading edge of the fifth conductive segment by greater than ninety degrees.

7. The apparatus of claim 6 in which the leading edge of the third conductive segment is spaced apart from the trailing edge of the fifth conductive segment by greater than ninety degrees.

8. The apparatus of claim 7 in which the output means includes a commutator coil.

9. The apparatus of claim 8 in which the output means includes a pair of conductors for conducting an alternating current from the first conductive means and the second conductive means.

10. The apparatus of claim 1 in which the return brush means includes
- a first return brush disposed on the second conductive portion of the first conductive means during the first portion of rotation, and
- a second return brush disposed on the sixth conductive portion of the second conductive portion of the second conductive means during the second portion of rotation.

11. The apparatus of claim 1 in which:
the first diode brush means includes
- a first diode brush disposed on the fourth conductive portion of the second conductive means,
- a second diode brush disposed on the third conductive portion of the first conductive means during the third portion of rotation, and
- a first diode connected to the first and second diode brushes for providing a circuit path for a flow of current from the second conductive means to the first conductive means during the third portion of rotation; and the second diode brush means includes
- a third diode brush disposed on the first conductive portion of the second conductive means during the fourth portion of rotation, and
- a second diode connected to the third and fourth diode brushes for providing a current path from the first conductive means to the second conductive means during the fourth portion of rotation.

12. The apparatus of claim 1 in which the second conductive portion of the first conductive means and the sixth conductive portion of the second conductive means are interleaved and have a common center of rotation.

13. The apparatus of claim 12 in which the return brush means includes a return brush disposed adjacent to the interleaved second and sixth conductive portions on their common center of rotation and is disposed alternately on the said second and sixth conductive portions as they rotate.

14. The apparatus of claim 1 in which the first and second conductive means further includes a nonconductive disc secured to the rotating shaft, and the first, second, and third conductive portions and the fourth, fifth, and sixth conductive portions extend arcuately and concentrically on the disc.

* * * * *